(12) United States Patent
Yoshimura et al.

(10) Patent No.: US 11,783,116 B2
(45) Date of Patent: Oct. 10, 2023

(54) RESEMBLING TRANSITION IDENTIFYING APPARATUS, RESEMBLING TRANSITION IDENTIFYING METHOD AND PROGRAM

(71) Applicant: NIPPON TELEGRAPH AND TELEPHONE CORPORATION, Tokyo (JP)

(72) Inventors: Yu Yoshimura, Tokyo (JP); Haruto Tanno, Tokyo (JP); Yu Adachi, Tokyo (JP); Hiroyuki Kirinuki, Tokyo (JP); Toshiyuki Kurabayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 16 days.

(21) Appl. No.: 17/602,280

(22) PCT Filed: Mar. 31, 2020

(86) PCT No.: PCT/JP2020/014779
§ 371 (c)(1),
(2) Date: Oct. 7, 2021

(87) PCT Pub. No.: WO2020/209139
PCT Pub. Date: Oct. 15, 2020

(65) Prior Publication Data
US 2022/0164523 A1 May 26, 2022

(30) Foreign Application Priority Data
Apr. 10, 2019 (JP) .................................. 2019-075121

(51) Int. Cl.
*G06F 40/143* (2020.01)
*G06F 40/134* (2020.01)

(52) U.S. Cl.
CPC .......... *G06F 40/143* (2020.01); *G06F 40/134* (2020.01)

(58) Field of Classification Search
CPC ............................ G06F 40/134; G06F 40/143
See application file for complete search history.

(56) References Cited

U.S. PATENT DOCUMENTS 9,053,177 B1 * 6/2015 Seo ........................ G06F 16/951
2009/0248678 A1 * 10/2009 Okamoto ............... G06F 16/355
707/999.005

(Continued)

FOREIGN PATENT DOCUMENTS

JP 2018116497 A 7/2018

OTHER PUBLICATIONS

Kurabayashi et al. (2017) "Automatic Test Script Generation on GUI Testing" Software Engineering Symposium 2017 Proceedings, pp. 260-264.

*Primary Examiner* — Thu V Huynh

(57) ABSTRACT

A similar transition identification device includes: acquisition means for acquiring structure information of a screen related to a Web application and element information indicating constituent elements of the screen; identification means for identifying a similar transition representing screen transitions to other screens displaying contents similar to each other from among screen transitions to one or more other screens capable of being transitioned from the screen related to the Web application, the identification means identifying the similar transition based on the structure information and the element information acquired by the acquisition means; and creation means for executing one or more screen transitions selected from the similar transition (Continued)

identified by the identification means and creating specification information related to transitions between screens of the Web application.

18 Claims, 10 Drawing Sheets

(56) References Cited

U.S. PATENT DOCUMENTS

| | | | | |
|---|---|---|---|---|
| 2011/0320928 | A1* | 12/2011 | Kuroda | H04N 1/00472 |
| | | | | 715/234 |
| 2015/0379113 | A1* | 12/2015 | Wang | H04L 67/306 |
| | | | | 707/738 |
| 2017/0017364 | A1* | 1/2017 | Kekki | G06F 16/9574 |
| 2017/0039076 | A1* | 2/2017 | Kurabayashi | G06F 3/0488 |
| 2020/0042567 | A1* | 2/2020 | Birch | G06K 9/6231 |

\* cited by examiner

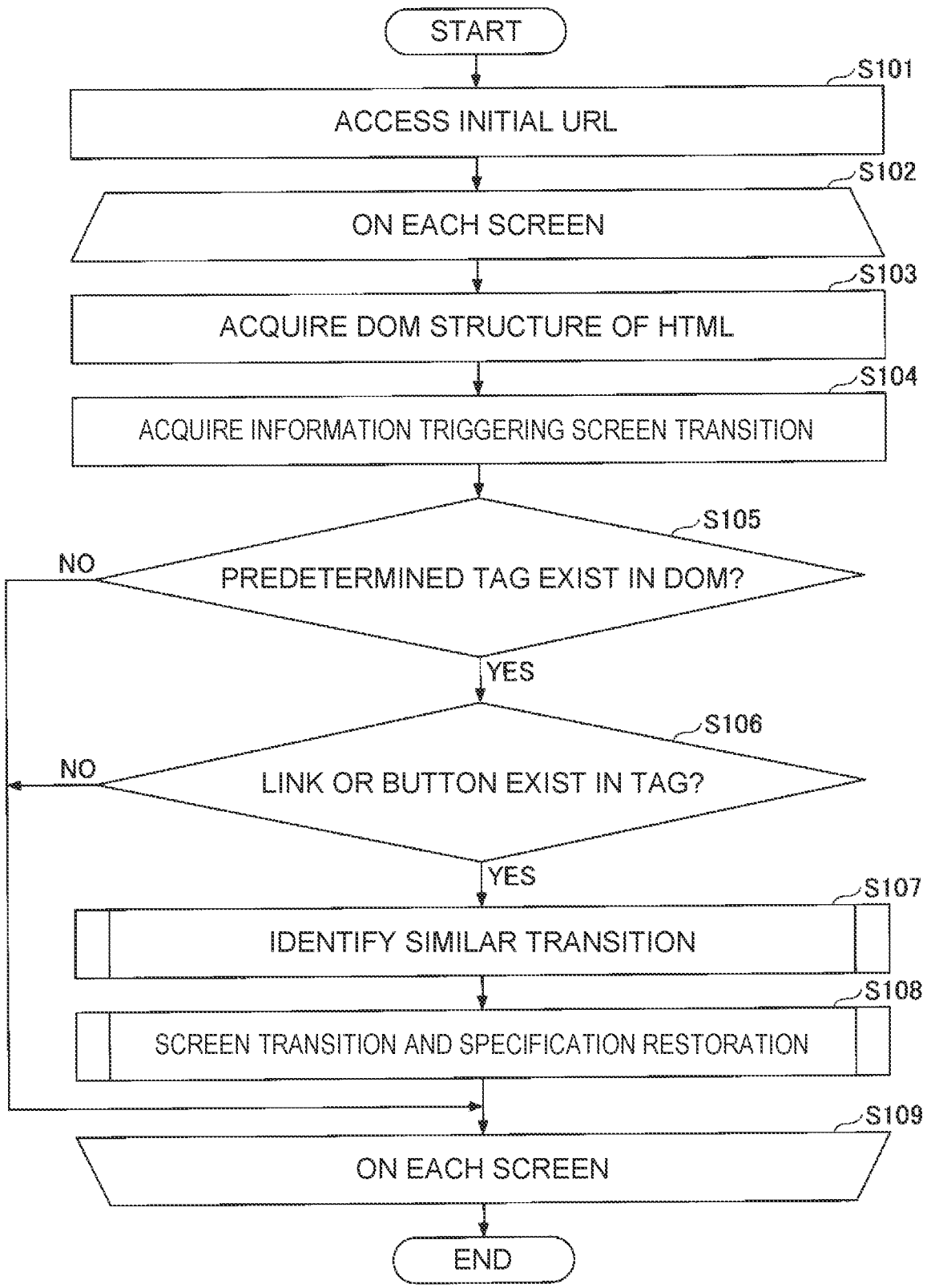

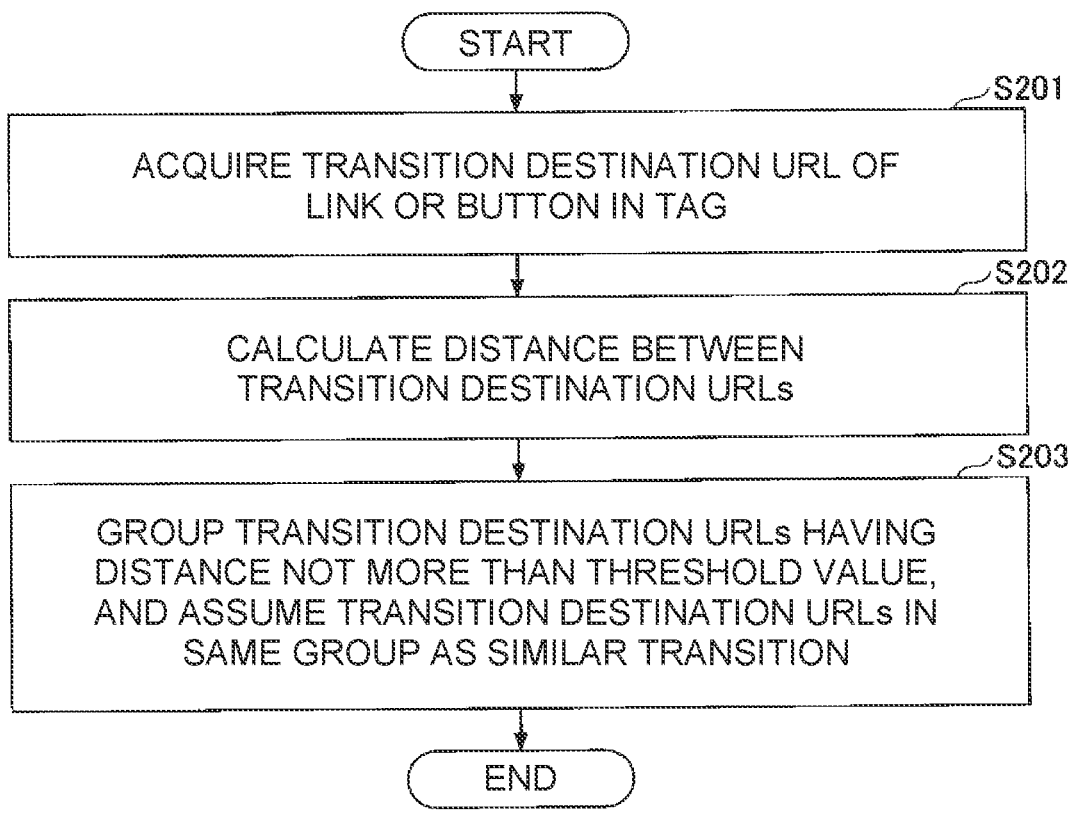

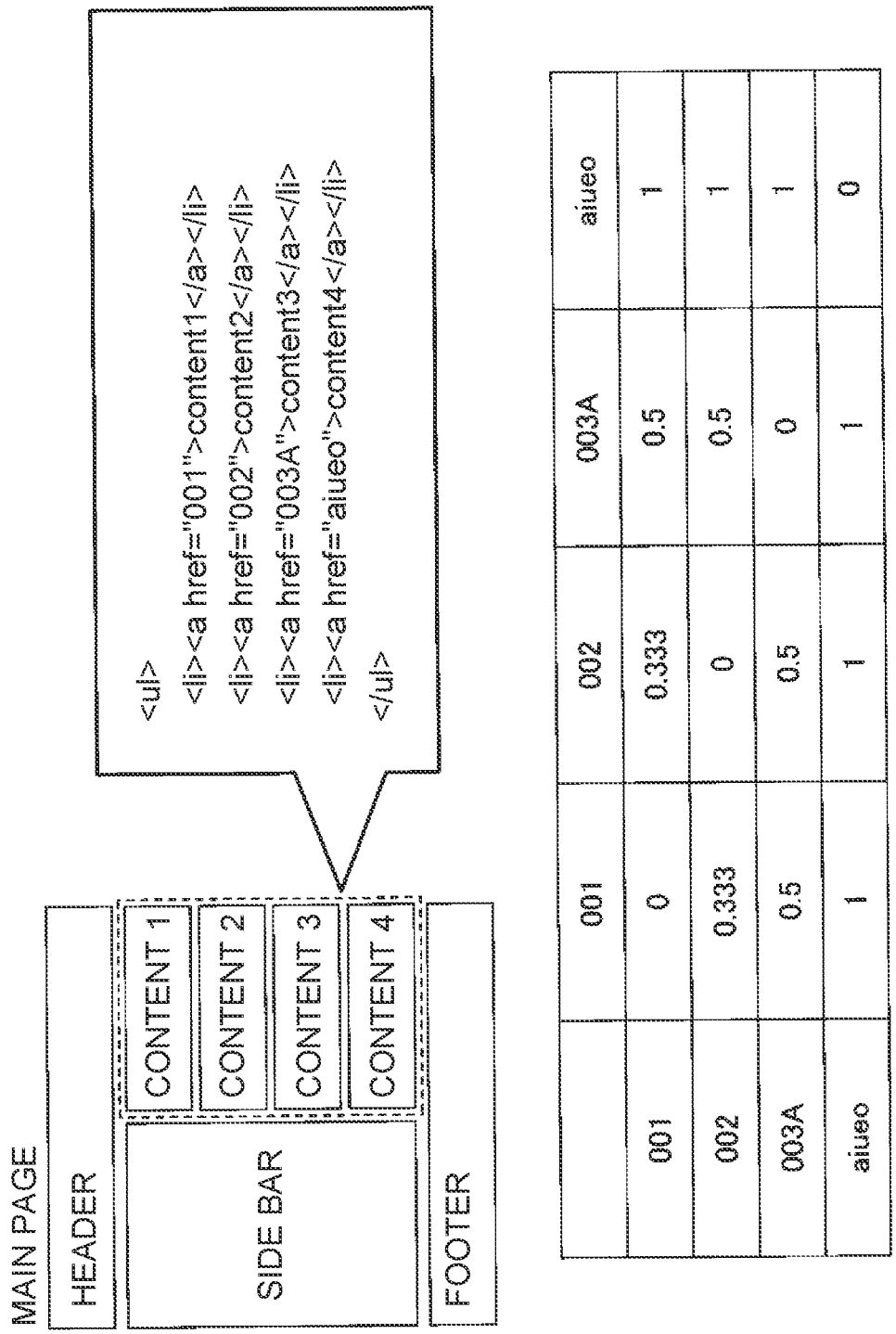

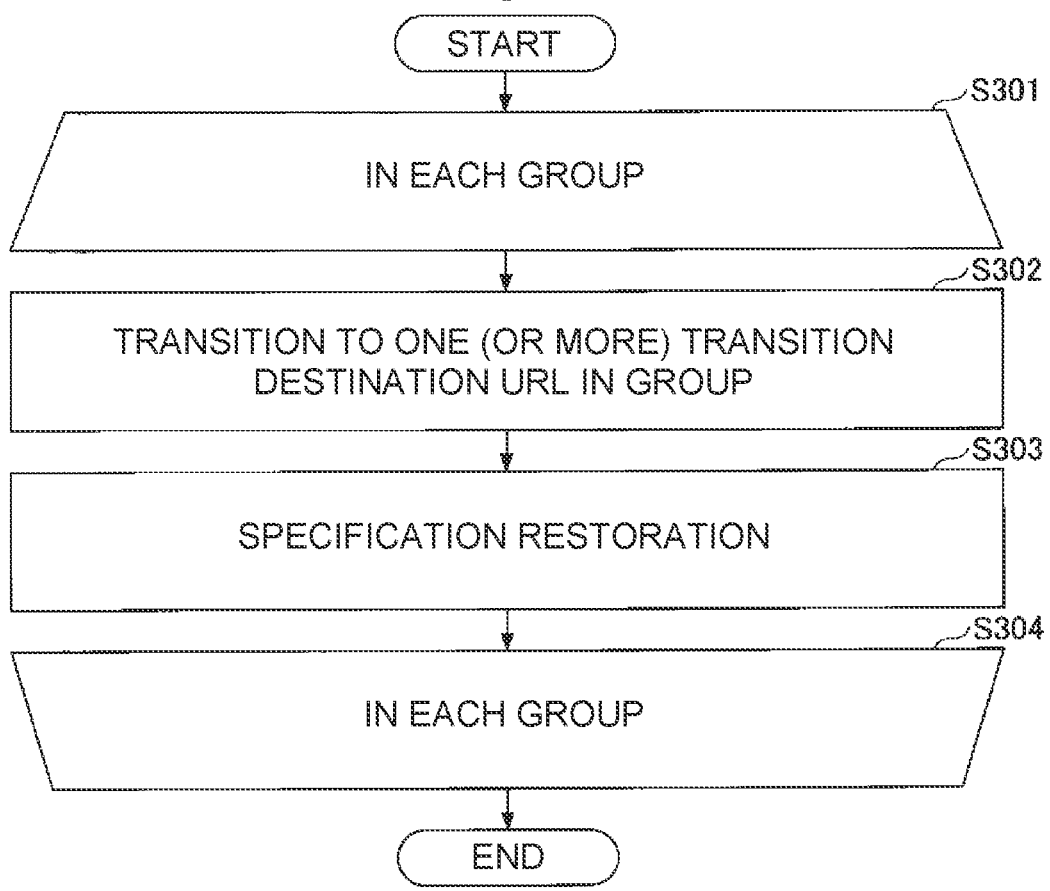

RESEMBLING TRANSITION IDENTIFYING APPARATUS, RESEMBLING TRANSITION IDENTIFYING METHOD AND PROGRAM

CROSS-REFERENCE TO RELATED APPLICATIONS

This application is a U.S. 371 Application of International Patent Application No. PCT/JP2020/014779, filed on 31 Mar. 2020, which application claims priority to and the benefit of JP Application No. 2019-075121, filed on 10 Apr. 2019, the disclosures of which are hereby incorporated herein by reference in their entireties.

TECHNICAL FIELD

The present invention relates to a similar transition identification device, a similar transition identification method, and a program.

BACKGROUND ART

In recent years, to quickly offer services that meet diversifying consumer needs, the developing style to develop software, such as a Web application, in a short cycle and to frequently release services has been increased. With this, frequency of conducting software tests for confirming normality in software operations has also been increased.

In the software test, a functional test is carried out to confirm whether or not the Web application to be tested operates just as the designer intended. Generally, the functional test includes a test related to screen transition (hereinafter, referred to as a "screen transition test"). The screen transition test is defined as "a test on a function capable of confirming, on a screen displayed, with respect to a client side for interaction from the client side, whether or not a Web application is implemented in accordance with specifications thereof."

The screen transition test requires manual operations, such as clicking links or buttons on a screen or inputting proper values in input forms, as the interaction from the client side. It is also required to repeatedly perform these operations on all screens. Consequently, among the functional tests, the screen transition test takes an enormous amount of time, and thereby reduction of the time is required.

As a method of reducing the time required for the screen transition test, a method of executing a script describing a test case (a test script) to automate the screen transition test is known. However, it is necessary to comprehend specifications of the Web application for creating the test script; accordingly, the work itself of creating the test script also requires much time. In general, in the case of automating the test by the test script, it is said that effect of reducing the to time cannot be seen unless the test is carried out three times or more.

Besides, in the case where some existing functions of the Web application are changed, the created test script sometimes cannot be used, and it becomes necessary to recreate the test script every time specification change is made. To deal with this, a technique that restores specification information by analyzing the Web application to be tested and automatically generates a test script from the restored specification information (a reverse-based automatic test script generation technique) is known (Patent Literature 1, Non-Patent Literature 1). The technique is hereinafter referred to as a "reverse base test technique."

The reverse base test technique reverses specifications while analyzing a source code of a Web application to be tested and an actual screen, and creates an exhaustive test case to automatically create a test script. With the reverse base test technique, it is possible to realize automation of the screen transition test without requiring creation of the test script by manual effort.

CITATION LIST

Patent Literature

Patent Literature 1: Japanese Patent Laid-Open No. 2018-116497

Non-Patent Literature

Non-Patent Literature 1: Toshiyuki Kurabayashi, Muneyoshi Iyama, Hiroyuki Kirinuki and Haruto Tanno "Automatic Test Script Generation on GUI Testing" Collected papers of Software Engineering Symposium 2017, pp. 260-264, September 2017

SUMMARY OF THE INVENTION

Technical Problem

Here, in the reverse base test technique, the specifications are restored while mechanically and exhaustively performing automated operation of all screen elements included in a screen of the Web application (for example, objects that can be operated, such as links or buttons); accordingly, in some cases, even the screen transitions that do not necessarily need the screen transition tests are also restored as the specifications, and the analysis takes time.

Examples of the case that does not need the exhaustive screen transition test include the case in which the screen transitions to similar contents are tested. Examples of the screen transitions to the similar contents include: the case of transitions from a membership list screen to member's personal data screens; the case of transitions from a product list screen to product's detailed information screens; and the case of transitions from a news list screen to news article screens. In the screen transitions to the similar contents, generally, links or buttons for transitions to detail pages of the respective contents are disposed on a main page in many cases as shown in FIG. 1.

In the Web application including the screen transitions to the similar contents as described above, the exhaustive screen transition test is not needed in some cases. For instance, in the example shown in FIG. 1, the tests exhaustively covering all of the screen transition from the main page to the detail page 1, the screen transition from the main page to the detail page 2, . . . , the screen transition from the main page to the detail page N are unnecessary; it is sometimes assumed to be sufficient to perform any one of the screen transition tests. This is because, for example, with regard to implementation of the portion of transition from the main page to the detail page of each content, the same source code is imported and reused in many cases, and accordingly, mere testing of screen transition to a detail page of one content can guarantee the functionality in the screen transitions to the detail pages of other contents at the same time.

Consequently, in Patent Literature 1 and Non-Patent Literature 1, it is determined whether or not the transition destination screens are similar screens, from the screen structure, to thereby restore the specifications. According to the techniques described in Patent Literature 1 and Non-Patent Literature 1, for instance, in the example shown in FIG. 1, the screen structures of all screens of the main page, the detail page 1, the detail page 2, . . . , the detail page N are compared, and thereby one specification covering from the detail page 1 to the detail page N can be restored. For this reason, by use of the techniques described in Patent Literature 1 and Non-Patent Literature 1, the problem of the reverse base test technique that "even the screen transitions that do not necessarily need the screen transition tests are also restored as specifications" can be solved.

However, in the techniques described in Patent Literature 1 and Non-Patent Literature 1, the screens are actually transitioned to acquire DOM (Document Object Model) structures, and screen structures are compared by using the acquired DOM structures. Consequently, the problem of the reverse base test technique that "analysis takes time" cannot be solved, and specification restoration takes still much time in some cases.

The present invention has been made in view of the above-described points, and an object of the present invention is to reduce the time required for specification restoration.

Means for Solving the Problem

To achieve the above object, an embodiment of the present invention includes: acquisition means for acquiring structure information of a screen related to a Web application and element information indicating constituent elements of the screen; identification means for identifying a similar transition representing screen transitions to other screens displaying contents similar to each other from among screen transitions to one or more other screens capable of being transitioned from the screen related to the Web application, the identification means identifying the similar transition based on the structure information and the element information acquired by the acquisition means; and creation means for executing one or more screen transitions selected from the similar transition identified by the identification means and creating specification information related to transitions between screens of the Web application.

Effects of the Invention

The time required for specification restoration can be reduced.

BRIEF DESCRIPTION OF DRAWINGS

FIG. 7 is a flowchart for illustrating an example of procedures executed by the client device in the embodiment of the present invention.

FIG. 8 is a flowchart for illustrating an example of identification procedures of a similar transition.

FIG. 9 is a diagram for illustrating an example of calculation result of distances.

FIG. 10 is a flowchart for illustrating an example of procedures of screen transition and specification restoration.

DESCRIPTION OF EMBODIMENTS

Figure 1:
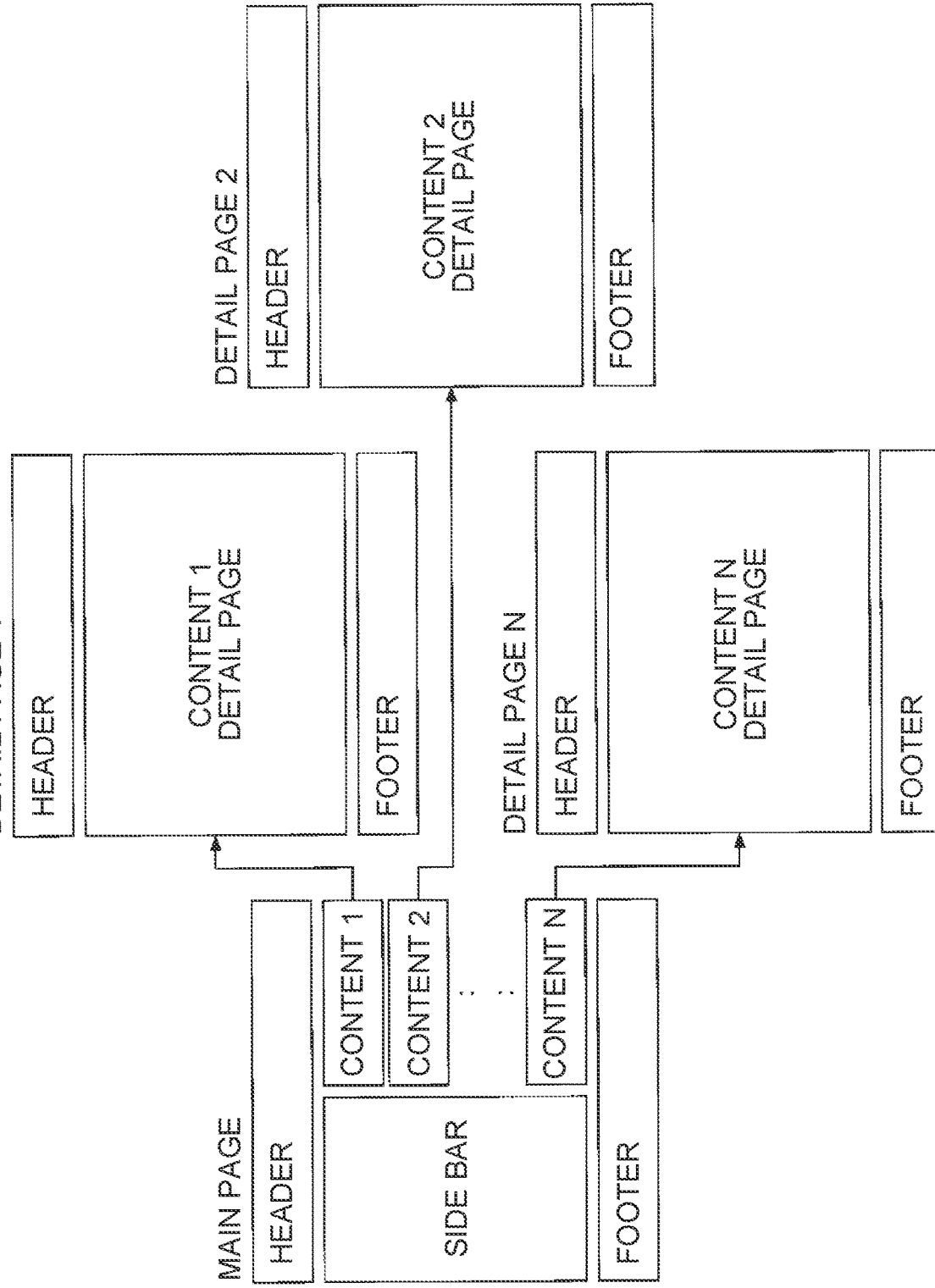
FIG. 1 is a diagram for illustrating an example of screen transitions to similar contents.

Hereinafter, an embodiment of the present invention will be described. As described above, the case where the exhaustive screen transition test is not needed means, in general, the case where "screen transitions to similar contents", such as screen transition from a content list screen to content detail screens, exists. In the embodiment of the present invention, the time required for specification restoration is reduced by identifying whether or not screen transition is one of the screen transitions to similar contents without actually causing the screen transition. Thus, in the embodiment of the present invention, the following procedures 1 to 4 are executed on each screen of the Web application to be tested.

(Procedure 1) A DOM structure of an HTML (Hypertext Markup Language) of a screen to be a target of specification restoration is acquired.

(Procedure 2) Information (attribute information, for example, a transition destination URL (Uniform Resource Locator), a label, or the like) of a screen element, such as links or buttons, triggering the screen transition is acquired. Note that the transition destination URL refers to a URL of the transition destination screen.

(Procedure 3) Identification whether or not the transition destination screen triggered by operation on the screen element, such as a link or a button, is a screen of a similar content is made.

(Procedure 4) Based on the identification result, necessary specification restoration is performed (in other words, for example, the specification restoration is performed from the screen transitions to one or more similar contents).

In the above procedure 3, without performing actual screen transition, whether or not the transition destination screen is the similar content screen is identified based on the information acquired in the procedures 1 and 2. The details of the procedure 3 (identification of the screen transition to the similar contents) will be described as follows. Note that, hereinafter, screen transitions to the similar contents are also referred to as a "similar transition."

<Details of Identification of Similar Transition>

In the case where whether or not the transition destination screen is a screen of similar content is to be identified, generally, it is required to solve the following two problems, Problem 1 and Problem 2.

(Problem 1) To identify whether or not the transition destination screen is a screen of similar content, it is necessary to actually operate a link, a button, or the like to perform screen transition and confirm a transition destination screen.

(Problem 2) Even if the actual screen transition is performed, it is difficult to mechanically determine whether or not the transition destination screen includes a content similar to (or the same as) those of other transition destination screens.

Since the embodiment of the present invention has as an object to reduce the time required for specification restoration, the embodiment solves the above problems 1 and 2 by use of characteristics of URLs and an HTML that are necessarily used in a Web application, without using information acquired by actual screen transitions. This makes it possible to restore necessary specifications (for example, minimal specifications) without taking much time for specification restoration.

Figure 2:
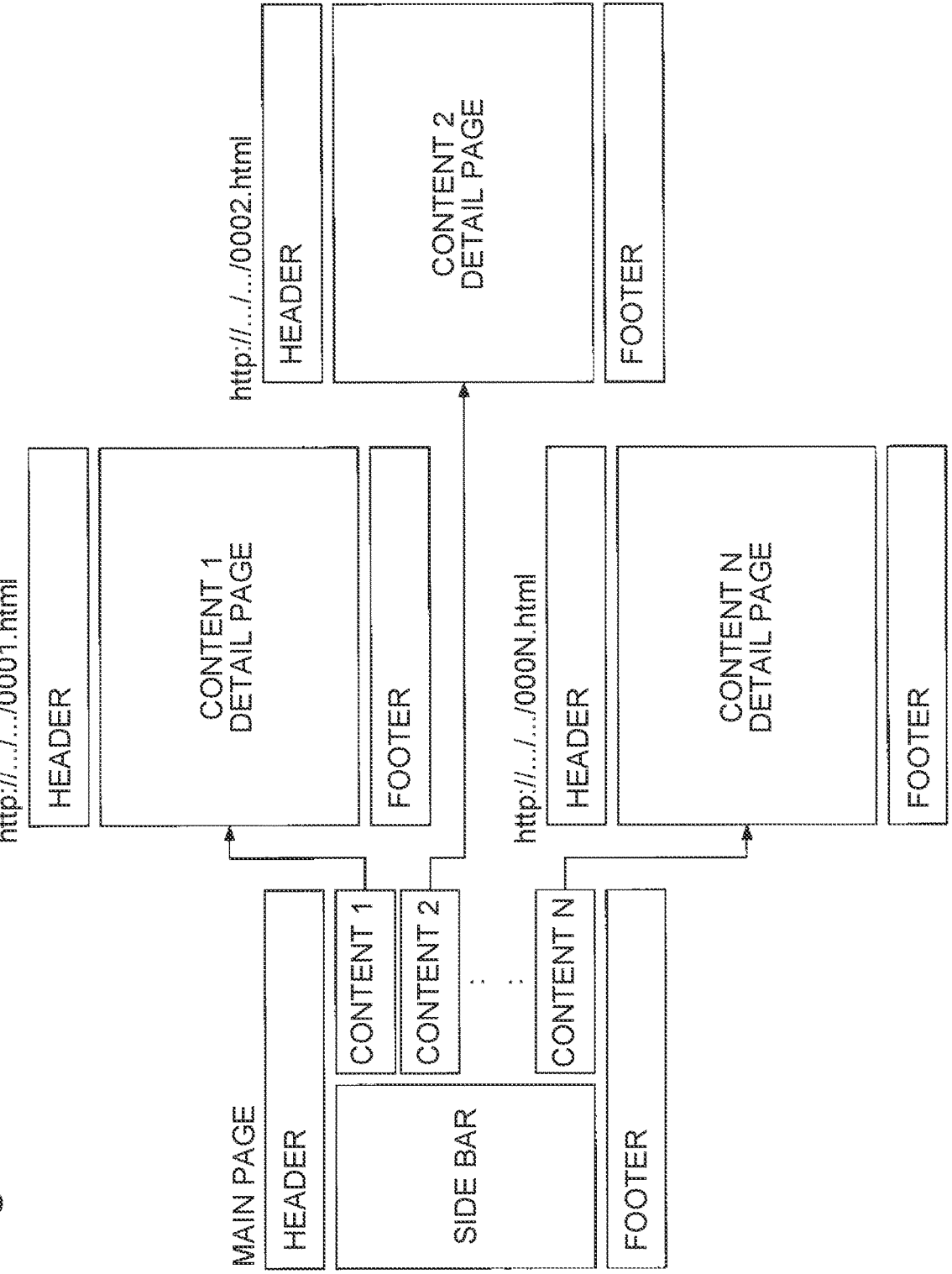
FIG. 2 is a diagram for illustrating an example of URLs of the similar contents.

A URL is hierarchically configured with a protocol, a host name, a domain name, and the like divided by slashes (/), and at the bottom thereof, a name identifying a content, such as a file name, is designated. Consequently, in the case of transitions to similar contents, it can be said that transitions to similar URLs are designated. For example, in the case of considering news articles as an example of the similar contents, as shown in FIG. 2, the URL of detail page of each news article includes an article number (0001, 0002, and the like) as the file name at the bottom of each URL, such as "http:// . . . / . . . /0001.html," "http:// . . . / . . . /0002.html," . . . , "http:// . . . / . . . /000N.html." In this manner, it is considered that the URLs for transitions to the similar content screens (transition destination URLs) are similar to one another.

Figure 3:
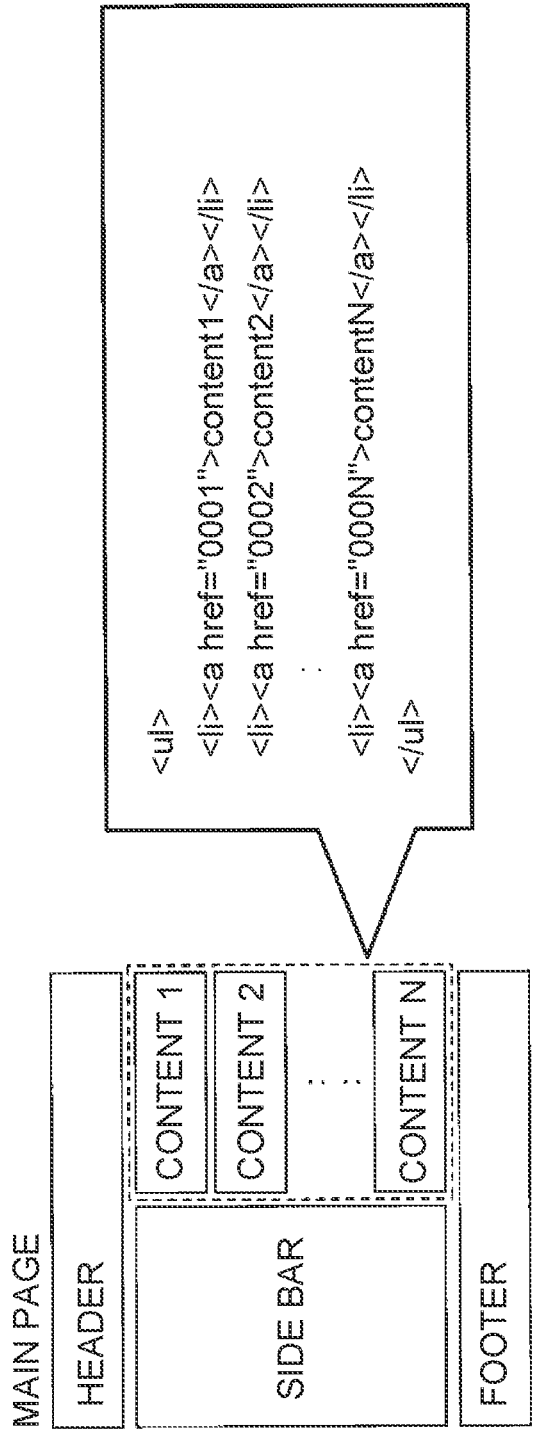
FIG. 3 is a diagram for illustrating an example of an HTML implementing the screen transitions to the similar contents.

An HTML is a markup language for composing a Web page, in which combinations of constituent elements called tags (or HTML tags) generate a screen. The tags include a tag for formatting the screen elements to be displayed, such as a table tag, a ul tag, an ol tag, or a dl tag. In general, a screen including screen transitions to similar contents composes the screen itself by use of these tags for allowing the display to be seen easily in many cases. For example, in FIG. 3, the links for screen transitions to the respective contents 1 to N are formatted by the <ul> tag. Thus, it as considered that the screen elements, such as the links and buttons, for performing transitions to the similar contents are formatted by the table tag, the ul tag, the ol tag, the dl tag or other tags (hereinafter, also referred to as "formatting tag") to be displayed in many cases.

By use of the above-described characteristics of URLs and an HTML, the embodiment of the present invention solves the above problems 1 and 2 in accordance with the following detailed procedures 3-1 to 3-5.

(Detailed procedure 3-1) It is determined whether or not any formatting tag exists in a DOM structure of a screen that is to be a target of specification restoration.

(Detailed procedure 3-2) In the case where the formatting tags exist in the DOM structure, it is determined whether or not any screen element (such as a link or button) triggering the screen transition exists in each formatting tag.

(Detailed procedure 3-3) In the case where the screen elements triggering the screen transitions exist in the formatting tag, the transition destination URLs set in these screen elements (such as the links or buttons) are acquired.

(Detailed procedure 3-4) A degree of similarity between the transition destination URLs is calculated. In other words, a character string at the bottom of each of the plural transition destination URLs is extracted, and a degree of similarity between the extracted character strings is calculated. To calculate the degree of similarity, for example, a distance calculation method between character strings, such as the Levenshtein distance, is used.

(Detailed procedure 3-5) The screen elements (such as the links or buttons) corresponding to the transition destination URLs having the degree of similarity not more than a threshold value are grouped, and the transition destination screens transitioned from the screen elements belonging to the same group are assumed to be the similar content screens. On the other hand, the transition destination screen transitioned from the screen element corresponding to the transition destination URL having the degree of similarity larger than the threshold value is assumed to be a screen of an independent content with no similar content. Since the length of the character string or similarity of the URL is quite different depending on each Web application, the above threshold value is not fixed, and any value in accordance with the Web application to be tested is appropriately set.

<Overall Configuration>

Figure 4:
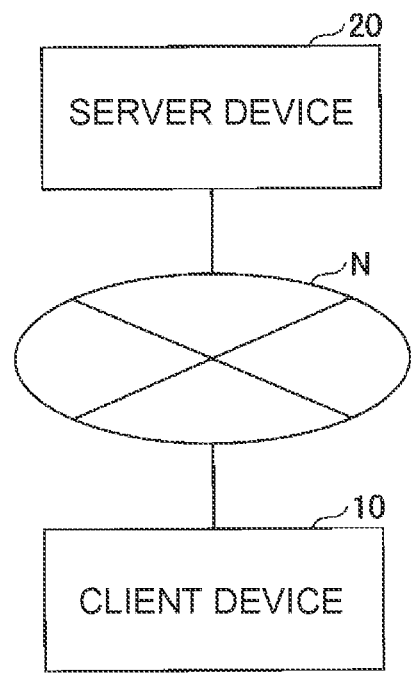
FIG. 4 is a diagram showing an example of an overall configuration of a system in an embodiment of the present invention.

Next, a system capable of executing the above procedures 1 to 4 to restore specifications will be described with reference to FIG. 4. FIG. 4 is a diagram showing an example of an overall configuration of the system in the embodiment of the present invention.

As shown in FIG. 4, the system in the embodiment of the present invention includes a client device 10 and a server device 20. The client device 10 and the server device 20 are communicably connected via any network N, such as LAN (Local Area Network) or the Internet.

The server device 20 is a computer or a computer system providing a Web application. The Web application provided by the server device 20 is software (application) to be tested.

The client device 10 supports testing of the Web application provided by the server device 20. As the client device 10, a PC (personal computer) or the like is used; however, the client device 10 is not limited thereto, and, for example, a smartphone, a tablet terminal, or other devices may be used.

The overall configuration of the system shown in FIG. 4 is a mere example, and any other configuration may be adopted. For example, the system in the embodiment of the present invention may include plural client devices 10 and plural server devices 20.

<Hardware Configuration>

Figure 5:
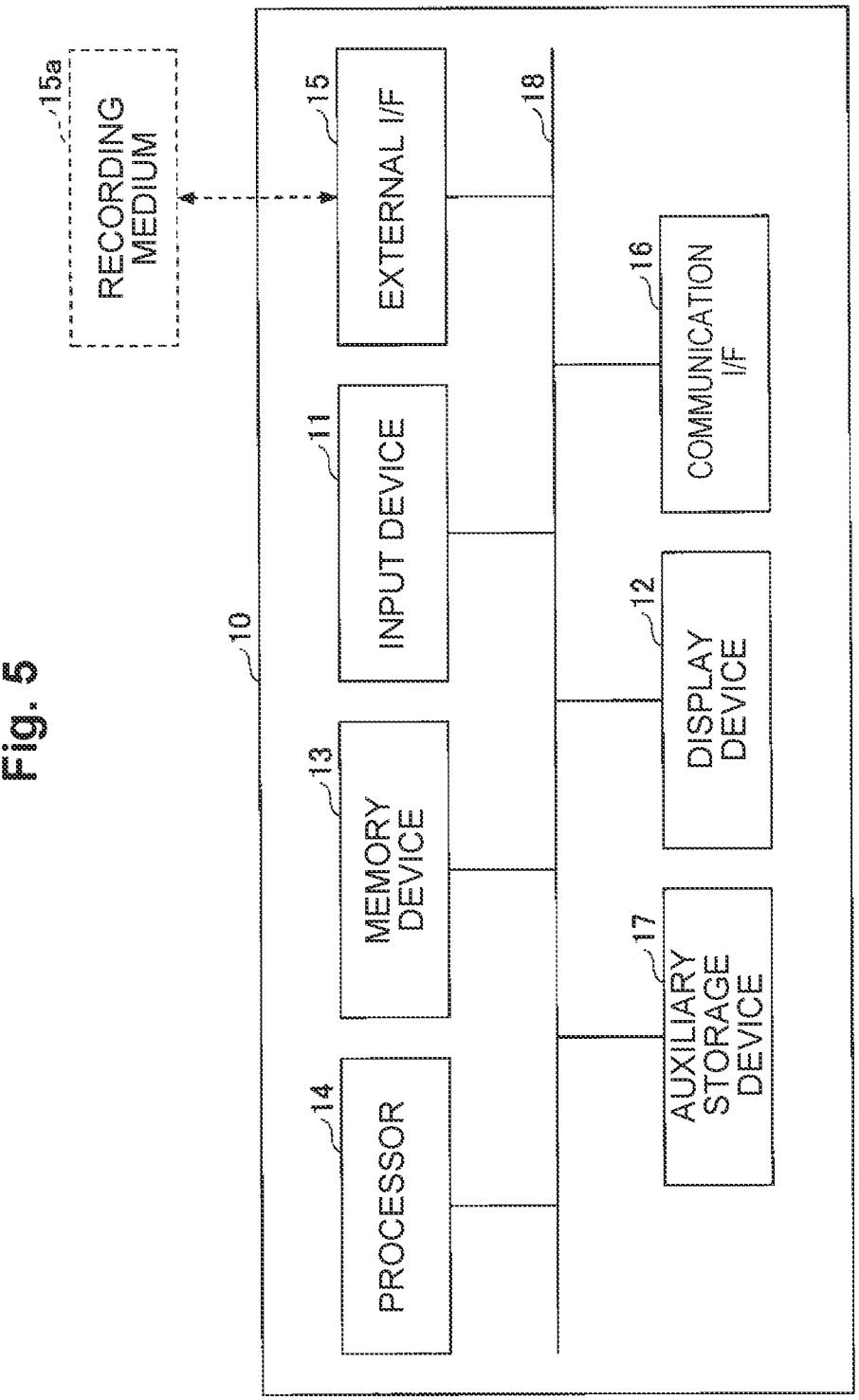
FIG. 5 is a diagram showing an example of a hardware configuration of a client device in the embodiment of the present invention.

Next, a hardware configuration of the client device 10 in the embodiment of the present invention will be described with reference to FIG. 5. FIG. 5 is a diagram showing an example of the hardware configuration of the client device 10 in the embodiment of the present invention.

As shown in FIG. 5, the client device 10 in the embodiment of the present invention includes, as hardware, an input device 11, a display device 12, a memory device 13, a processor 14, an external I/F 15, a communication I/F 16, and an auxiliary storage device 17. These respective pieces of hardware are communicably connected with one another via a bus 18.

Examples of the input device 11 include a keyboard, a mouse, and a touch panel. Examples of the display device 12 include a display.

Examples of the memory device 13 include a RAM (Random Access Memory), and a ROM (Read Only Memory). Examples of the processor 14 include a CPU (Central Processing Unit).

The external I/F 15 is an interface with external devices. Examples of the external device include a recording medium 15a. Examples of the recording medium 15a include a CD (Compact Disc), a DVD (Digital Versatile Disk), an SD memory card (Secure Digital memory card), and a USB (Universal Serial Bus) memory card.

The communication I/F 16 is an interface for connecting the client device 10 to the network N. The client device 10 can perform data communication with the server device 20 via the communication I/F 16.

Examples of the auxiliary storage device 17 include an HDD (Hard Disk Drive), and an SSD (Solid State Drive).

The client device 10 in the embodiment of the present invention can implement various processing, which will be described later, by having the hardware configuration shown in FIG. 5. Note that, in FIG. 5, the case in which the client device 10 in the embodiment of the present invention is realized by a single computer; however, the present invention is not limited thereto, and the client device 10 may be realized by plural computers. Moreover, a single computer may include plural processors 14, plural memory devices 13, plural auxiliary storage devices 17, or other devices.

<Functional Configuration>

Figure 6:
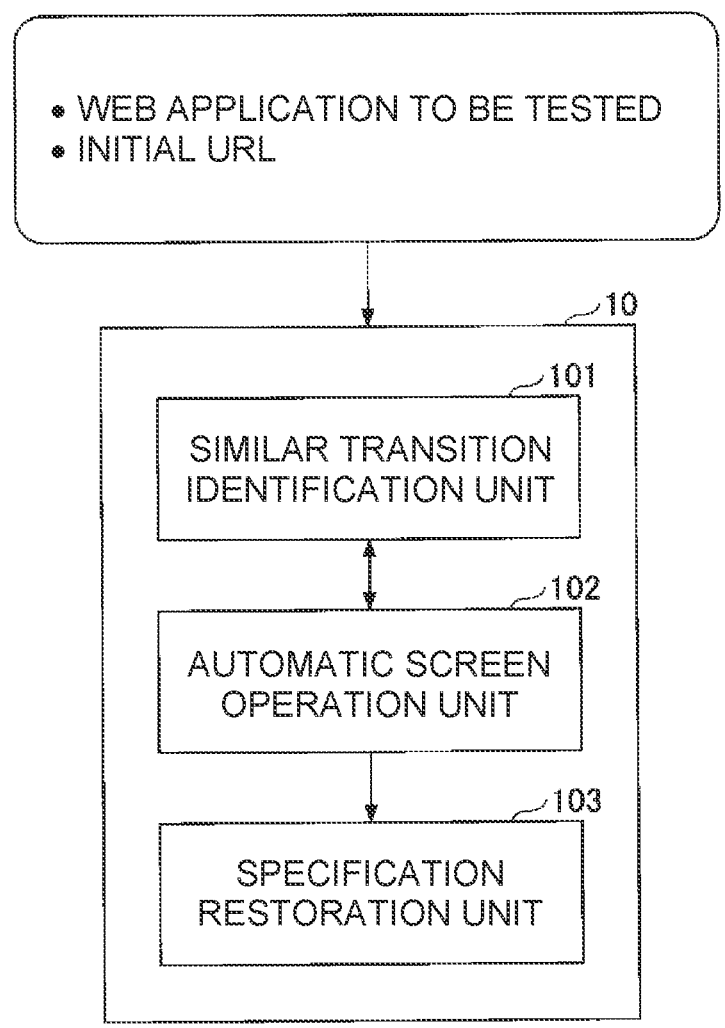
FIG. 6 is a diagram showing an example of a functional configuration of the client device in the embodiment of the present invention.

Next, a functional configuration of the client device 10 in the embodiment of the present invention will be described with reference to FIG. 6. FIG. 6 is a diagram showing an example of the functional configuration of the client device 10 in the embodiment of the present invention.

As shown in FIG. 6, the client device 10 in the embodiment of the present invention includes, as functional units, a similar transition identification unit 101, an automatic screen operation unit 102, and a specification restoration unit 103. Each of these functional units can be implemented by, for example, processing executed by the processor 14 caused by one or more programs installed in the client device 10.

The similar transition identification unit 101 acquires the DOM structure of the screen to be the target of specification restoration and the information of the screen elements triggering the screen transitions. Based on the acquired information, the similar transition identification unit 101 identifies the screens of the similar contents among the transition destination screens of the screen to be the target of specification restoration. In short, the similar transition identification unit 101 identifies the similar transition from plural screen transitions.

The automatic screen operation unit 102 accesses an initial URL showing a URL of a screen to be the target of specification restoration (for example, a top page) in the Web application to be tested.

The automatic screen operation unit 102 selects one (or more) URL from the transition destination URLs to the screens of the similar contents identified by the similar transition identification unit 101. Then, the automatic screen operation unit 102 operates the screen element (such as the link or button) corresponding to the selected URL. This causes the screen transition to the similar content screen.

The specification restoration unit 103 restores the specifications from the result of screen transition, to thereby create specification information. For example, the specification restoration unit 103 creates, as the specification information, information associating the screen element operated by the automatic screen operation unit 102 with the URL of the transition destination screen transitioned by the operation.

<Processing Procedures>

Hereinafter, processing procedures executed by the client device 10 in the embodiment of the present invention will be described with reference to FIG. 7. FIG. 7 is a flowchart for illustrating an example of the processing procedures executed by the client device 10 in the embodiment of the present invention.

In step S101, the automatic screen operation unit 102 accesses the initial URL. Consequently, the screen (HTML) corresponding to the initial URL is acquired, and the screen is displayed on the display device 12, for example, For example, the initial URL may be inputted by a user or may be stored in the auxiliary storage device 17 or other devices in advance.

The steps S102 to S109 subsequent thereto are repeatedly executed on the screen corresponding to the initial URL and all screens that have actually transitioned from the screen as a starting point. In the steps S102 to S109, the above procedures 1 to 4 are executed. Hereinafter, a screen to be processed during the steps S102 to S109 (namely, a target of specification restoration) is referred to as a "target screen."

In step S103, the similar transition identification unit 101 acquires the DOM structure of the HTML of the target screen.

In step S109, the similar transition identification unit 101 acquires information of the screen element triggering the screen transition (for example, attribute information, such as the transition destination URL or label) in the target screen. Hereinafter, the information acquired in the step is referred to as "screen element information."

In step S105, the similar transition identification unit 101 determines whether or not the formatting tag exists in the DOM structure acquired in the above step S103.

In the case where the formatting tag does not exist in the DOM structure (NO in step S105), the process proceeds to step S109. In this case, if there is any screen actually transitioned from the target screen, the steps S102 to S109 are executed on the screen that has actually transitioned (or a screen from among the actually transitioned screens) as the target screen. On the other hand, in the case where the formatting tag exists in the DOM structure (YES in step S105), the process proceeds to step S106.

In step S106, the similar transition identification unit 101 determines whether or not any screen element (for example, a link or button) triggering the screen transition exists in the formatting tag.

In the case where the screen element triggering the screen transition does not exist in the formatting tag (NO in step S106), the process proceeds to step S109. In this case, similar to the above, if there is any screen actually transitioned from the target screen, the steps S102 to S109 are executed on the screen that has actually transitioned (or a screen from among the actually transitioned screens) as the target screen. On the other hand, in the case where the screen element triggering the screen transition exists in the formatting tag (YES in step S106), the process proceeds to step S107. Hereinafter, the screen element triggering the screen transition is also referred to as a "transition-triggering element."

In step S107, identification procedures of similar transition are executed. In the identification procedures of the similar transition, the similar transition is identified from among screen transitions to the contents caused by operating transition destination URLs (or, operating the screen elements, such as the links or buttons, corresponding to the transition destination URL). Details of the identification procedures of the similar transition will be described later.

In step S108, screen transition and specification restoration procedures are executed. In the screen transition and specification restoration procedures, the screen transition is actually performed, and thereby the specification restoration is performed. Details of the screen transition and specification restoration procedures will be described later.

Subsequently, the identification procedures of the similar transition in the above step S107 will be described with reference to FIG. 8. FIG. 8 is a flowchart for illustrating an example of the identification procedures of the similar transition.

In step S201, the similar transition identification unit 101 acquires the transition destination URLs of the transition-triggering elements (for example, links or buttons) in the formatting tag from the screen element information.

In step S202, the similar transition identification unit 101 calculates the distance between the transition destination URLs. In other words, by use of the character strings at the bottom of the transition destination URLs, the similar transition identification unit 101 calculates the distance between the character strings. As described above, as the distance, for example, the Levenshtein distance can be used.

Here, an example of a distance calculated by use of the Levenshtein distance is shown in FIG. 9. FIG. 9 shows distances in the case where the character strings at the bottom of the transition destination URLs to the four contents are "001," "002," "003A," and "aiueo." For example, the calculation result of the Levenshtein distance between the character strings "001" and "001" is "0." Similarly, the calculation result of the Levenshtein distance between the character strings "001" and "002" is "0.333." Similarly, the calculation result of the Levenshtein distance between the character strings "001" and "003A" is "0.5." The same is true for others.

In step S203, the similar transition identification unit 101 groups the transition destination URLs having distances not more than a predetermined threshold value, and assumes the screen transitions based on the transition destination URLs belonging to the same group as the similar transition. In other words, the screen transitions to the contents caused by operating the transition destination URLs belonging to the same group (or, operating the screen elements, such as the links or buttons, corresponding to the transition destination URLs) are assumed as the similar transition. Since the transition destination URL and the transition-triggering element are in one-to-one correspondence, grouping of the transition destination URLs causes grouping of the transition-triggering elements (that is, the screen elements, such as the links or buttons) in the similar manner.

For example, in the case where the threshold value is "0.4," in the example shown in FIG. 9, the transition destination URL to the content 1 and the transition destination URL to the content 2 belong to the same Group. In this case, the URLs to be actually operated for screen transitions in the specification restoration, which will be described later, are three: "the transition destination URL to the content 1 or the transition destination URL to the content 2"; "the transition destination URL to the content 3"; and "the transition destination URL to the content 4." Note that, in this case, the transition destination URLs are categorized into three groups.

Alternatively, for instance, in the case where the threshold value is "0.6," in the example shown in FIG. 9, the transition destination URL to the content 1, the transition destination URL to the content 2, and the transition destination URL to the content 3 belong to the same group. In this case, the URLs to be actually operated for screen transitions in the specification restoration, which will be described later, are two: "any one of the transition destination URL to the content 1, the transition destination URL to the content 2, and the transition destination URL to the content 3"; and "the transition destination URL to the content 4." Note that, in this case, the transition destination URLs are categorized into two groups.

Incidentally, the embodiment of the present invention uses one threshold value, but the threshold value is not limited thereto; the plural threshold values may be used. For example, by use of two threshold values "0.4" and "0.6," the transition destination URLs may be grouped into the first group of the distance not more than "0.4," the second group of the distance more than "0.4" and not more than "0.6," and the third group of the distance more than. "0.6."

Subsequently, the screen transition and specification restoration procedures in the above step S108 will be described with reference to FIG. 10. FIG. 10 is a flowchart for illustrating an example of the screen transition and specification restoration procedures.

The steps S301 to S304 are repeatedly executed on each group into which the transition destination URLs are categorized in the above step S203. Hereinafter, a group to be processed during the steps S301 to S304 is referred to as a "target group."

In step S302, the automatic screen operation unit 102 selects one (or more) transition destination URL belonging to the target group, and accesses the selected transition destination URL. This causes the screen transition to the screen corresponding to the transition destination URL.

Note that, for example, in the case where several transition destination URLs belonging to the target group are selected, the automatic screen operation unit 102 accesses each of the selected transition destination URLs.

In step S303, the specification restoration unit 103 restores the specifications from the result of screen transition, to thereby create specification information. As described above, the specification restoration unit 103 creates, for example, information associating the transition destination URL accessed in the above step S302 with the screen element corresponding to the transition destination URL as the specification information (namely, screen transition information which is part of the specification information).

CONCLUSION

As described above, the client device 10 in the embodiment of the present invention groups the screen transitions to the similar contents, and restores the specifications of one (or more) screen transition belonging to the group. At this time, the client device 10 in the embodiment of the present invention groups the screen transitions to the similar contents by use of the characteristics of the HTML and the characteristics of the URLs without performing actual screen transitions.

For this reason, the client device 10 in the embodiment of the present invention can restore the specifications with minimum screen transitions. In other words, the client device 10 can reduce unnecessary specification restoration. For example, as compared to the techniques described in Patent Literature 1 and Non-Patent Literature 1, the client device 10 can reduce the time required for the specification restoration. In addition, since only one (or more) screen transition from among the screen transitions to the similar contents is used for the specification restoration, unnecessary screen transitions to the similar contents are reduced; consequently, the client device 10 can restore specifications according to actual design of the Web application.

The embodiment of the present invention is applicable, for example, to the reverse base test technique described in Patent Literature 1 and Non-Patent Literature 1. However, the scope of application of the embodiment of the present invention is not limited to the reverse base test technique, and the present invention is applicable to any technique requiring the specification restoration of the Web application.

The present invention is not limited to the above embodiment specifically disclosed, and various modifications and variations can be made without departing from the scope of the claims.

REFERENCE SIGNS LIST

10 Client device
20 Server device
101 Similar transition identification unit
102 Automatic screen operation unit
103 Specification restoration unit

The invention claimed is:

1. A similar transition identification device comprising a processor configured to process:
   acquiring structure information of a screen related to a Web application and element information indicating constituent elements of the screen;
   identifying a similar transition, the similar transition representing a plurality of screen transitions from the screen to other screens displaying contents that are similar to each other among a set of screen transitions from the screen to one or more other screens according to a design of the screen, the identifying further comprising identifying the similar transition based on a combination including the structure information and the element information associated with the screen, the structure information using tag data to specify predetermined formatting of displaying at least a part of the constituent elements of the screen, the element information indicating resource location data associated with retrieving the contents associated with the constituent elements of the screen, and the resource location data specifying resource locations within a predetermined distance of each other in a hierarchical structure of addressing the contents;
   performing one or more screen transitions associated with the similar transition, wherein the one or more screen transitions represent a part of the plurality of screen transitions associated with the screen; and
   generating, based on contents associated with the performed one or more screen transitions, specification information, the specification information specifying the plurality of screen transitions of the Web application.

2. The similar transition identification device according to claim 1,
   wherein the screen related to the Web application is composed of a Hypertext Markup Language (HTML),
   wherein the tag data includes a predetermined HTML tag,
   wherein the identifying further comprises determining whether or not the predetermined HTML tag is included in the structure information representing a Document Object Model (DOM) structure of the screen,
   wherein, when the predetermined HTML tag is determined to be included in the structure information, the determining further comprises determining whether or not the element information related to a constituent element, from among the constituent elements of the screen, triggering the plurality of screen transitions to the other screens is included in the HTML tag, and
   wherein, when the element information related to the constituent element triggering the one or more screen transitions to the other screens is determined to be included in the HTML tag, the identifying further comprises identifying the similar transition.

3. The similar transition identification device according to claim 2, wherein the identifying further comprises:
   determining a degree of similarity between addresses in the resource location data for the one or more screen transitions to one or more screens from the screen related to the Web application, and
   categorizing screen transitions whose calculated degree of similarity is not more than a predetermined threshold value into a same group as the one or more screen transitions to the other screens displaying the contents that are similar to each other, to thereby identify the similar transition.

4. The similar transition identification device according to claim 3,
   wherein each of the addresses in the resource location data includes a URL, and
   wherein the identifying further comprises determining a predetermined distance between character strings designated at bottoms of the respective addresses, to thereby determine the degree of similarity between the addresses.

5. The similar transition identification device according to claim 1, wherein the identifying further comprises:
   determining a degree of similarity between addresses in the resource location data for the one or more screen transitions to one or more screens from the screen related to the Web application, and
   categorizing the one or more screen transitions whose calculated degree of similarity is not more than a predetermined threshold value into a same group as the one or more screen transitions to the other screens displaying the contents that are similar to each other, to thereby identify the similar transition.

6. The similar transition identification device according to claim 5,
   wherein each of the addresses in the resource location data includes a Uniform Resource Locator (URL), and
   wherein the identifying further comprises determining a predetermined distance between character strings designated at bottoms of the respective addresses, to thereby determine the degree of similarity between the addresses.

7. A similar transition identification method, comprising:
   acquiring structure information of a screen related to a Web application and element information indicating constituent elements of the screen;
   identifying a similar transition, the similar transition representing a plurality of screen transitions from the screen to other screens displaying contents that are similar to each other among a set of screen transitions from the screen to one or more other screens according to a design of the screen, the identifying further comprising identifying the similar transition based on a combination including the structure information and the element information associated with the screen, the structure information using tag data to specify predetermined formatting of displaying at least a part of the constituent elements of the screen,
   the element information indicating resource location data associated with retrieving the contents associated with the constituent elements of the screen, and the resource location data specifying resource locations within a predetermined distance of each other in a hierarchical structure of addressing contents;
   performing one or more screen transitions associated with the similar transition, wherein the one or more screen transitions represent a part of the plurality of screen transitions associated with the screen; and generating, based on contents associated with the performed one or more screen transitions, specification information, the specification information specifying the plurality of screen transitions of the Web application.

8. The similar transition identification method according to claim 7, wherein the screen related to the Web application includes an HTML, wherein the tag data includes a predetermined HTML tag, wherein the identifying further comprises determining whether or not a predetermined HTML tag is included in the structure information representing a DOM structure of the screen, wherein, when the predetermined HTML tag is determined to be included in the structure information, the identifying further comprises determining whether or not the element information related to a constituent element, from among the constituent elements of the screen, triggering the one or more screen transitions to the other screens is included in the HTML tag, and wherein, when the element information related to the constituent element triggering the one or more screen transitions to the other screens is determined to be included in the HTML tag, the identifying further comprises identifying the similar transition.

9. The similar transition identification method according to claim 8, wherein the identifying further comprises:

determining a degree of similarity between addresses in the resource location data for the one or more screen transitions to one or more screens from the screen related to the Web application, and categorizing screen transitions whose calculated degree of similarity is not more than a predetermined threshold value into a same group as the screen transitions to the other screens displaying the contents that are similar to each other, to thereby identify the similar transition.

10. The similar transition identification method according to claim 9, wherein each of the addresses in the resource location data includes a URL, and wherein the identifying further comprises determining a predetermined distance between character strings designated at bottoms of the respective addresses, to thereby determine the degree of similarity between the addresses.

11. The similar transition identification method according to claim 7, wherein the identifying further comprises:

determining a degree of similarity between addresses for the one or more screen transitions to one or more screens from the screen related to the Web application, and categorizing screen transitions whose calculated degree of similarity is not more than a predetermined threshold value into a same group as the screen transitions to the other screens displaying the contents that are similar to each other, to thereby identify the similar transition.

12. The similar transition identification method according to claim 11, wherein each of the addresses in the resource location data includes a URL, and wherein the identifying further comprises determining a predetermined distance between character strings designated at bottoms of the respective addresses, to thereby determine the degree of similarity between the addresses.

13. A computer-readable non-transitory recording medium storing a computer-executable program instruction that when executed by a processor cause a computer system to:

acquire structure information of a screen related to a Web application and element information indicating constituent elements of the screen;

identify a similar transition, the similar transition representing a plurality of screen transitions from the screen to other screens displaying contents that are similar to each other among a set of screen transitions from the screen to one or more other screens according to a design of the screen, the identifying further comprising identifying the similar transition based on a combination including the structure information and the element information associated with the screen, the structure information using tag data to specify predetermined formatting of displaying at least a part of the constituent elements of the screen, the element information indicating resource location data associated with retrieving the contents associated with the constituent elements of the screen, and the resource location data specifying resource locations within a predetermined distance of each other in a hierarchical structure of addressing the contents;

performing one or more screen transitions associated with the similar transition, wherein the one or more screen transitions represent a part of the plurality of screen transitions associated with the screen; and generating, based on contents associated with the performed one or more screen transitions, specification information, the specification information specifying the plurality of screen transitions of the Web application.

14. The computer-readable non-transitory recording medium according to claim 13, wherein the screen related to the Web application is composed of an HTML, wherein the tag data includes a predetermined HTML tag, wherein the identifying further comprises determining whether or not a predetermined HTML tag is included in the structure information representing a DOM structure of the screen, wherein, when the predetermined HTML tag is determined to be included in the structure information, the identifying further comprises determining whether or not the element information related to a constituent element, from among the constituent elements of the screen, triggering the one or more screen transitions to the other screens is included in the HTML tag, and wherein, when the element information related to the constituent element triggering the one or more screen transitions to the other screens is determined to be included in the HTML tag, the identifying further comprises determining the similar transition.

15. The computer-readable non-transitory recording medium according to claim 14, wherein the identifying further comprises:

determining a degree of similarity between addresses in the resource location data for the one or more screen transitions to one or more screens from the screen related to the Web application, and categorizing screen transitions whose calculated degree of similarity is not more than a predetermined threshold value into a same group as the screen transitions to the other screens displaying the contents that are similar to each other, to thereby identify the similar transition.

16. The computer-readable non-transitory recording medium according to claim 13, wherein the identifying further comprises:
   determining a degree of similarity between addresses in the resource location data for the one or more screen transitions to one or more screens from the screen related to the Web application, and
   categorizing screen transitions whose calculated degree of similarity is not more than a predetermined threshold value into a same group as the screen transitions to the other screens displaying the contents that are similar to each other, to thereby identify the similar transition.

17. The computer-readable non-transitory recording medium according to claim 16, wherein each of the addresses is a URL, and
   wherein the identifying further comprises determining a predetermined distance between character strings designated at bottoms of the respective addresses, to thereby determine the degree of similarity between the addresses.

18. The computer-readable non-transitory recording medium according to claim 15, wherein each of the addresses is a URL, and
   wherein the identifying further comprises determining a predetermined distance between character strings designated at bottoms of the respective addresses, to thereby determine the degree of similarity between the addresses.

* * * * *